April 19, 1966    G. E. KELLOGG    3,246,579

FLUID PRESSURE RESPONSIVE MECHANISM

Filed Nov. 12, 1963

INVENTOR.
George E. Kellogg
BY
D.D. McGraw
HIS ATTORNEY 3,246,579
FLUID PRESSURE RESPONSIVE MECHANISM
George E. Kellogg, Miamisburg, Ohio, assignor to General Motors Corporation, Detroit, Mich., a corporation of Delaware
Filed Nov. 12, 1963, Ser. No. 322,860
2 Claims. (Cl. 92—96)

The invention relates to a mechanism responsive to fluid pressure in a chamber for reciprocating or exerting a proportional force on a portion of the mechanism under influence of the fluid pressure, and more particularly relates to such a mechanism utilized to obtain power brake reaction in a control system for fluid power brake actuation. In the preferred embodiment, the mechanism may be utilized in a system such as that disclosed and claimed in application Serial No. 291,119, now Patent No. 3,170,536, entitled "Hydraulic Power Brake and Power Steering System," filed June 27, 1963. It is a feature of the invention to utilize a diaphragm sealing the reaction piston concurrently with a diaphragm support element placed at the juncture of the intersecting surfaces of the reaction piston and the cylinder in which it reciprocates to prevent extrusion of the diaphragm into the corner so formed. The diaphragm covers portions of the reaction piston and cylinder surfaces exposed to the pressure chamber and conforms to the shape of these surfaces. In attempting to conform to a corner, such a diaphragm may be injured by pressure extrusion. The provision of the diaphragm support member, which also acts as a wiper so that it directs the diaphragm away from the corner, effectively prevents such damage.

Figure 1:
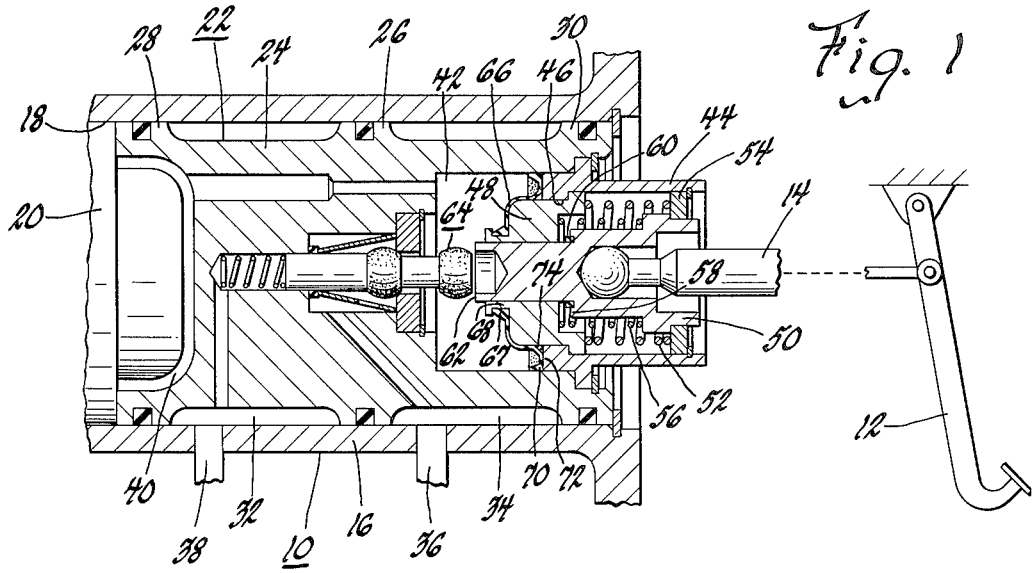
FIGURE 1 is a sectional view with parts broken away of portions of a hydraulic power brake control system utilizing the invention.
Figure 2:
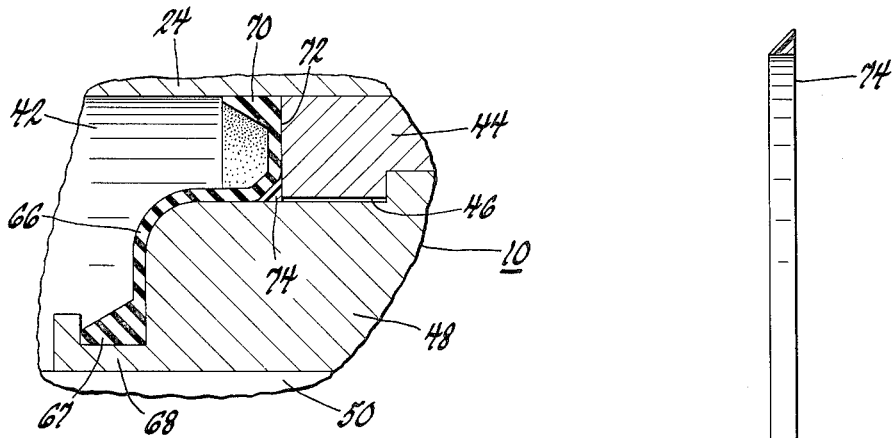
FIGURE 2 is an enlarged partial section of the structure as shown in FIGURE 1.
Figure 3:
FIGURE 3 is a sectional view of the diaphragm support member.

The disclosure in FIGURE 1 illustrates a portion of a power brake control mechanism. As described more fully in the application above noted, the disclosure of which is hereby incorporated by reference, the brake booster 10 is controlled by movement of the brake pedal 12 acting through the push rod 14. The booster includes a housing 16 formed to provide a cylinder 18 in which the brake power apply piston 20 is reciprocably received. A valve piston assembly 22 is also received in cylinder 18. This assembly is generally formed as a spool 24 provided with a centrally positioned land 26 and end lands 28 and 30. Annular chambers 32 and 34 are, therefore, provided between the lands. A hydraulic fluid pressure inlet 36 in housing 16 connects chamber 34 with a suitable source of fluid pressure supply. A fluid pressure outlet 38 formed in housing 16 connects chamber 32 to the return portion of the fluid portion of the fluid pressure system.

A chamber 40 is provided between the power brake apply piston 20 and the end of spool 24 on which land 28 is formed. This chamber is pressurized to provide power actuation of the brake apply piston 20. Control of the application of pressure to this chamber is accomplished by a closed center valve arrangement received within the spool 24 and actuated by the vehicle operator through movement of the brake pedal 12 and the push rod 14.

A chamber 42 is formed in the rear end of spool 24 and receives the control valve assembly and the brake reaction assembly. An annular retainer 44, formed to provide a cylinder 46 therein, is secured in the end of chamber 42 and reciprocably receives the reaction piston 48 which in turn reciprocably receives the valve actuating member 50. Push rod 14 is pivotally connected to actuating member 50 for movement of the member in accordance with movement of the brake pedal 12.

A compression spring 52 reacts against piston 48 and a ring retainer 54 secured in the rear end of the retainer 44 to urge mating shoulders formed on the retainer 44 and the piston 48 into engagement as illustrated. A second compression spring 56 urges a shoulder formed on the valve actuating member 50 into engagement with the ring retainer 54 and reacts against piston 48. A shoulder 58 formed by the provision of a forward reduced end of actuating member 50 is axially spaced from reaction piston 48 when the brakes are in the released position, and a rubber snubber 60 is positioned on shoulder 58 so that quiet engagement of that shoulder with piston 48 occurs when reaction is being taken through the shoulder. The forward reduced end of valve actuating member 50 extends into piston 48 in sealing relationship and is provided with a valve seat 62 which forms a part of the booster control valve assembly.

The valve mechanism 64 controls the admission to chamber 42 of pressurized fluid provided to annular chamber 34 as more particularly described in the above noted application, so that the presssure furnished chamber 40 actuates the brake system in the desired manner. Thus the brake actuating pressure is provided in chamber 42 and this pressure acts on piston 48 over a differential area to provide brake feel, or reaction.

An annular diaphragm 66 is secured at its inner periphery 67 to a neck 68 extending into chamber 42 from piston 48. The outer periphery 70 of diaphragm 66 abuts the end 72 of retainer 44 which forms a portion of one wall of chamber 42. Thus a corner is provided at the junction formed by piston 48 and retainer 44 where the piston passes into the cylinder 46. A diaphragm support member 74 is formed as a ring which extends closely about piston 48 and abuts the retainer end 72. Member 74 is preferably formed with a cross section of generally triangular form so that its right angle corner is positioned at the corner formed by piston 48 and retainer 44 exposed to chamber 42. It may be made of a suitable hard plastic material or of metal. A portion of the diaphragm 66 engages one surface of the member 74 and the pressure in chamber 42 holds the diaphragm against the member and also holds the member against the retainer 44. Due to the configuration of member 74, it has a wiping action on the cylindrical outer surface of piston 48 so as to prevent the diaphragm 66 from closely approaching the corner covered by the member. Diaphragm 66 is, therefore, prevented from being extruded into the corner or into the cylinder 46. Damage to the diphragm is thus prevented and a full and proper seal is maintained.

The utilization of a thin diaphragm in conjunction with the diaphragm support member has a negligible effect on the sensitivity of the reaction piston 48 so that it receives and transmits a proportional force to the brake operator. As the pressure builds up in chamber 42, piston 48 is urged rearwardly against the force of spring 56, transmitting initial reaction forces through that spring to valve actuating member 50. The spring will compress until shoulder 58 engages valve 48 through snubber 60, and further reaction forces generated by the differential area of piston 48 acted on by pressure in chamber 42 will be transmitted directly to the valve actuating member 50 from the piston. This force is in turn transmitted to the push rod 14 and the brake pedal 12 to provide pedal feel to the operator.

I claim:
1. A fluid pressure responsive mechanism comprising, a cylinder body, a piston reciprocably received in said cylinder body and extending through one end thereof, means forming a pressure chamber externally of said cylinder with said piston and said cylinder body defining a wall section thereof whereby said piston is movable in said cylinder body under influence of fluid pressure in said chamber, a diaphragm secured to said piston and having the outer periphery thereof abutting the end of said cylinder body exposed to said chamber, and an annular wiper ring of triangular cross section received in wiping relation with said piston around said piston and abutting said cylinder end and supporting a portion of said diaphragm to prevent diaphragm extrusion between said piston and said cylinder body.

2. In a housing having a fluid pressure chamber formed therein, a differential area pressure responsive mechanism forming one wall of said chamber and comprising, means reciprocably displaceable in said chamber in response to pressure changes in said chamber, a chamber wall section secured to said housing and having a cylinder formed therein and reciprocably receiving said displaceable means, a diaphragm seal extending over at least the portion of the surface of said displaceable means exposed to said chamber and adjacent said wall section and further extending over at least the portion of the surface of said wall section exposed to said chamber and adjacent said displaceable means, and a diaphragm support member of substantially triangular cross section positioned at the junction of said displaceable means and said wall section exposed to said chamber, said diaphragm support member movable relative to said wall section and to said displaceable means thereby preventing diaphragm extrusion into said cylinder under influence of fluid pressure in said chamber.

References Cited by the Examiner

UNITED STATES PATENTS 3,154,288 10/1964 Tripoli _____ 251—335 X
3,170,536 2/1965 Van House et al. ____ 180—77 X M. CARY NELSON, *Primary Examiner.*